(12) United States Patent
Chou et al.

(10) Patent No.: US 7,543,093 B2
(45) Date of Patent: Jun. 2, 2009

(54) METHOD AND SYSTEM FOR STREAM BURST DATA TRANSFER

(75) Inventors: Jenya Chou, Shanghai (CN); Minliang Sun, Shanghai (CN)

(73) Assignee: Shanghai Magima Digital Information Co., Ltd., Shanghai (CN)

( * ) Notice: Subject to any disclaimer, the term of this patent is extended or adjusted under 35 U.S.C. 154(b) by 219 days.

(21) Appl. No.: 11/661,439

(22) PCT Filed: Aug. 30, 2004

(86) PCT No.: PCT/CN2004/001003

§ 371 (c)(1),
(2), (4) Date: Feb. 28, 2007

(87) PCT Pub. No.: WO2006/024193

PCT Pub. Date: Mar. 9, 2006

(65) Prior Publication Data

US 2007/0260793 A1 Nov. 8, 2007

(51) Int. Cl.
*G06F 13/42* (2006.01)
*G06F 13/28* (2006.01)
*G06F 13/36* (2006.01)
*G06F 13/32* (2006.01)

(52) U.S. Cl. .......... 710/105; 710/35; 710/241; 710/244

(58) Field of Classification Search .......... 710/35, 710/243
See application file for complete search history.

(56) References Cited

U.S. PATENT DOCUMENTS 4,788,638 A   11/1988   Ogawa et al.

(Continued)

FOREIGN PATENT DOCUMENTS

| CN | 86108261 | 6/1987 |
|---|---|---|
| CN | 1050936 | 3/1991 |
| CN | 128924 | 2/2001 |
| EP | 0 343 770 | 11/1989 |

OTHER PUBLICATIONS

ARM Corporation; "AMBA Specification"; ARM Corporation; Revision 2.0; May 13, 1999; all pages.*
International Search Report for International Application No. PCT/CN2004/001003 dated Jun. 2, 2005.

*Primary Examiner*—Paul R Myers
*Assistant Examiner*—Ryan M Stiglic
(74) *Attorney, Agent, or Firm*—Hamre, Schumann, Mueller & Larson, P.C.

(57) ABSTRACT

The method and system for data transfer between the master device and the slave device through the bus are presented. It includes arbitrating the requests of bus usage from the master device; the master device obtained the authorization by arbitrating transfers the data of the stream bursts, and transmits the bus-mastering signal to the bus at the same time; when the bus-mastering signal is judged to be CONT signal, the data transfer operation of segment burst for data transfer of current stream burst is continued; when the bus-mastering signal is judged to be SAME signal or DIFF signal, it is checked if there is a new bus request with higher level from other master devices; when a new bus request with higher level from other master devices is detected, such request and the next segment burst request in the data transfer operation of stream burst of the current master device are arbitrated; the master device obtained authorization by arbitrating performs data transfer first; when the bus-mastering signal is judged to be a LAST signal, it returns to the initial operation.

10 Claims, 6 Drawing Sheets

U.S. PATENT DOCUMENTS

| | | |
|---|---|---|
| 5,293,493 A | 3/1994 | Smith et al. |
| 5,448,704 A * | 9/1995 | Spaniol et al. ............... 710/316 |
| 6,081,860 A | 6/2000 | Bridges et al. |
| 6,718,422 B1 | 4/2004 | Kelley et al. |
| 6,775,727 B2 * | 8/2004 | Moyer ......................... 710/113 |
| 6,981,088 B2 * | 12/2005 | Holm et al. ................. 710/306 |
| 7,337,232 B2 * | 2/2008 | Unger ......................... 709/232 |
| 7,418,535 B2 * | 8/2008 | Kang et al. .................. 710/110 |
| 2003/0188007 A1 * | 10/2003 | Unger ......................... 709/232 |
| 2004/0205267 A1 * | 10/2004 | Holm et al. .................... 710/35 |
| 2005/0216608 A1 * | 9/2005 | Wang et al. .................... 710/22 |
| 2007/0005857 A1 * | 1/2007 | Kang et al. .................. 710/113 |
| 2007/0255873 A1 * | 11/2007 | Chou et al. .................. 710/113 |

* cited by examiner

METHOD AND SYSTEM FOR STREAM BURST DATA TRANSFER

TECHNICAL FIELD

The present invention relates to a method and a system for data transfer, and particularly relates to a method and a system for quickly and efficiently transferring data between master devices and slave devices through the bus in the architecture of multiple master devices.

BACKGROUND OF THE INVENTION

For rapid real-time signal processing, a computer system, especially a multi-processor system, is often configured with multiple processing units for controlling and quickly processing data simultaneously. The processing units of the system may comprise of various devices, such as Central Processing Unit (CPU), Digital Signal Processor (DSP) and memories. Similarly for on-chip systems, mass devices are integrated into a common chip. In consideration of die size and cost, such a system shares resources among multiple processing units by using the same bus. Therefore, between mass devices, a device which transmits a request to the bus asking for the data transferring is called a master device; a target device, which will receive the data transferring from the master device, is called a slave device. In a multiple devices system, the number of master devices and slave devices may be above two, if these devices need using a system bus at the same time may result in data conflict. For avoiding the data conflicting issue, only one master device is permitted to use the system bus at a time. A master device transmits a bus usage request at first, and will not control the bus until it is arbitrated and authorized by the bus arbiter. Secondly the master device send out addresses and data information, in order to write the data to specified addresses of the slave devices or read data from specified addresses of the slave devices. The bus usage will not be freed until the data transference between the master device and the slave devices is finished.

In general, the master device always transmits a single address at a time, and correspondingly, only allowed to transfer single data to the same address of the same slave device. When the master device needs to transfer data to different addresses of the same slave device or to different slave devices, it has to transmit new bus usage requests and is arbitrated again by the bus. For instance, a Chinese patent (patent No. 86108261) discloses such a data transfer system. When the system transfers data from I/O (Input/Output) device to a main memory, the I/O device 16 needs to transmit data to an input buffer 30 by a data bus 40, and then the data are stored in the addresses of the buffer specified by an address register. At that time, the address register 28 and a count register will refresh respectively. If the data are written in a positive direction, the address register 28 pluses 1 and the count register substrates 1; and if the data are read in a negative direction, the address register 28 substrates 1 and the count register still substrates 1. In this kind of system, when the master device needs to transmits multiple data continuously, the system will take several arbitration periods to complete all the data transfer processes from the time a first bus usage request is transmitted, resulting in some defects, such as low efficiency of the bus and long latency.

Burst-type data transfer method improves the single-type data transfer system. The burst-type data transfer is able to transfer a lot of data continuously at a time, but still has drawbacks. Data transferred by the burst-type data transfer system are required to be in continuous addresses. Namely, when a master device performs a read operation, data should be read from sequential addresses of the same slave device; when a master device performs a write operation, data should be written to sequential addresses of the same slave device. Once the data need to be transferred to discontinuous addresses, the master device has to transmit another bus usage request, and let the bus arbiter arbitrates again.

To overcome above deficiencies, the instant invention provides a new bus system, in which data are transferred in form of stream bursts.

SUMMARY OF THE INVENTION

An object of the present invention is to provide a data transfer method and a data transfer system, in which data are transferred in form of stream bursts for effectively promoting the bus usage efficiency.

According to an aspect of the invention, a method for data transfer between master devices and slave devices through the bus is provided, and said data transfer process involving data transfer in form of stream burst. The method comprises the following steps:

a. arbitrating bus usage requests from master devices;
b. the master device authorized after arbitration, starting data transfer in form of stream burst (at least one segment burst included), and at the same time, transmitting a bus-mastering signal to the bus;
c. judging what kind of signal the bus-mastering signal is among CONT signal, LAST signal or intermediate signals, wherein CONT signal denotes a segment burst of a stream burst does not end, LAST signal denotes a stream burst ends, and the intermediate signals denote ending of one segment burst of a stream burst but the whole stream burst does not end;
d. when the bus-mastering signal is judged to be a CONT signal, the data transfer of a segment burst of the current stream burst continuing;
e. when the bus-mastering signal is judged to be an intermediate signal, checking if there is a new bus request with higher level from other master devices;
f. when a new bus request with higher level from other master devices is detected, arbitrating between the new bus request and the request of the next segment burst in the current stream burst of the first master device;
g. after arbitration, one authorized master device will performing data transfer;
h. when the bus-mastering signal is judged to be a LAST signal, the operation returning to step a.

According to another aspect of the invention, a system performs data transfer between master devices and slave devices through the bus, and said data transfer involving data transfer in form of stream burst. The system comprises:

a judging device, judging which signal a bus-mastering signal is among CONT signal, LAST signal or intermediate signals, wherein the CONT signal denotes a segment burst of a stream burst does not end, the LAST signal denotes a stream burst ends, the intermediate signals denote a segment burst of a stream burst ends but the whole stream burst does not end;

a detecting device, detecting whether there is a new bus request with higher level from other master devices when the bus-mastering signal is an intermediate signal;

an arbitrating device, arbitrating between the request of the next segment burst of a stream burst of current mastering device and the detected bus requests with higher level from other master devices; and a data transfer device, transferring data between the master devices and the slave devices according to the arbitrating result of the arbitrating device.

The invention transfers data in form of stream burst, and the stream bursts may be from or to discontinued addresses. Therefore it is not subject to the limits of continuous addresses or same slave devices, but also be able to transfer a great number of data at one time, which promoting the bus usage efficiency.

In the other hand, during stream burst data transfer, segment bursts of a stream burst are respectively set to corresponding priority levels. Not only in a stream burst operation, the segment bursts are allowed to be processed in an order based on priority levels; but also during the stream burst operation, a bus usage request from a new stream burst with higher priority level may be responded in precedence.

BRIEF DESCRIPTION OF THE DRAWINGS

The drawings are auxiliary interpretation of the exemplary embodiments of the invention, and are combined with the exemplary embodiments for further disclosing, but not limiting, features of the present invention. Other objects, features and merits of the present invention will become clearer from the following description. The same signs in the accompanying drawings are designated as corresponding components or steps of the embodiments, in which.

DETAILED DESCRIPTION OF EMBODIMENTS OF THE INVENTION

Figure 1:
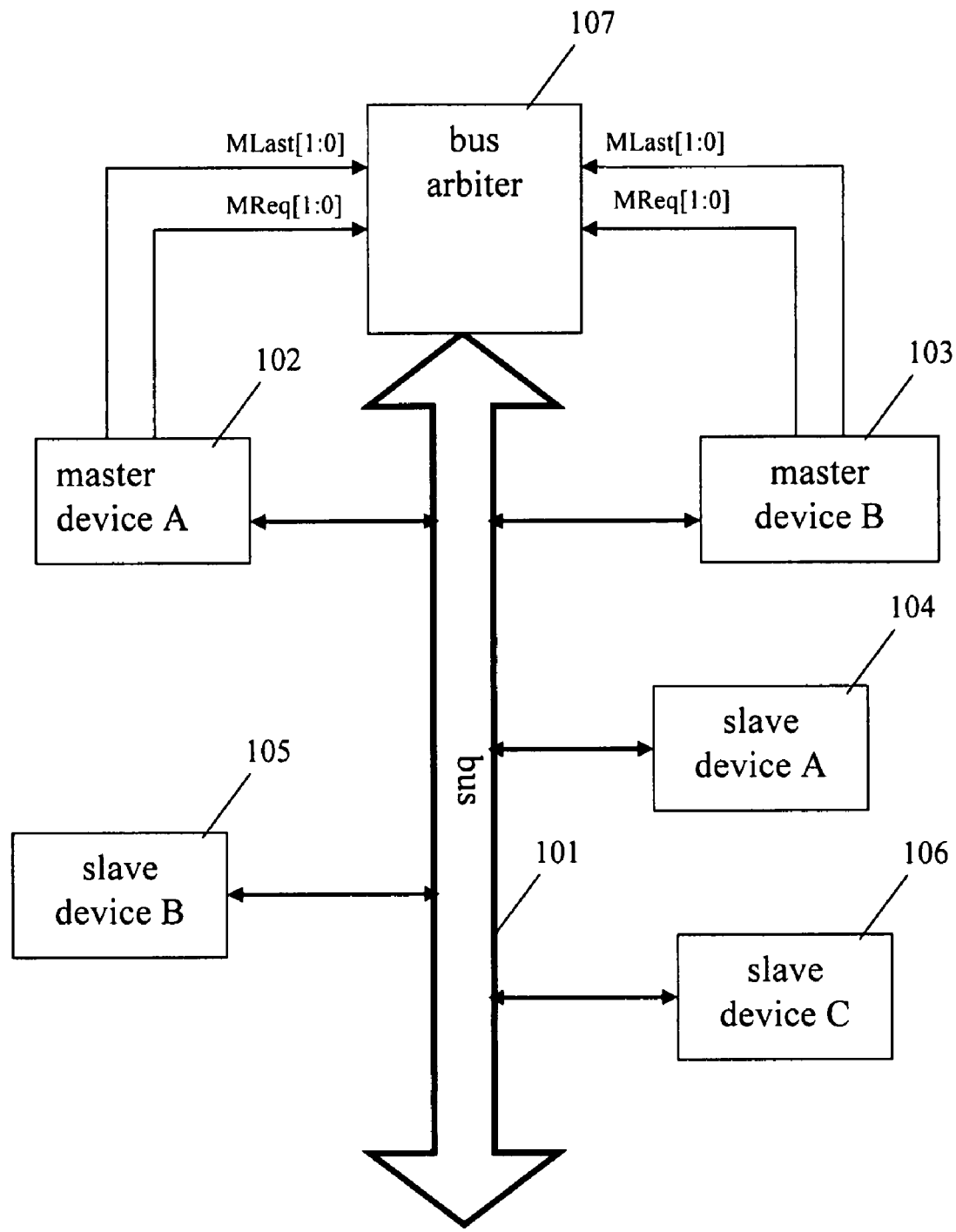
FIG. 1 is a structural view of a bus system according to an embodiment of the present invention.

A bus system of the present invention comprises master devices, slave devices, and an arbiter for arbitrating bus usage requests of the master devices. When the arbiter authorizes a master device, the master device performs write or read operation through the bus by means of stream bursts. The master device transmits signals sequences of bus requests, which includes a series of sequential mastering signals for denoting operation status of data transfer. The signals sequences may be a plurality of single data, a plurality of segment bursts with discontinuous target addresses, or a plurality of single data and bursts with target addresses at different slave devices. The data signals sequences transmitted by the master devices in accordance with the present invention is defined as stream bursts. Each stream burst at least has a segment burst. The segment burst may be a single data or a burst, wherein the burst are the data which have a series of continuous and aligned addresses and have length of integer power of 2.

Data transfer status, which is denoted by mastering signals of the master devices, at least comprises the following types: a segment burst not ending; a stream burst ending; a stream burst not ending but some of its segment burst already ending. Correspondingly, these mastering signals are CONT, LAST and intermediate signals. The CONT signal denotes a segment burst of a stream burst does not end; the LAST signal denotes a stream burst ends; and the intermediate signals denote a segment burst of a stream burst ends, but the stream burst does not end. In one embodiment of the present invention, in order to make segment bursts of a stream burst can access different slave devices, the third type of data transfer status may be divided into two further types: (1) a stream burst not ending, but the current segment burst is ended, and the next segment burst accessing the same slave device as the current segment burst; (2) a stream burst not ending, but the current segment burst is ended, and next segment burst needs to access a different slave device from the current segment burst. Correspondingly, the intermediate signals are divided into SAME signal and DIFF signal. The SAME signal denotes that the current segment burst ends, and predicts that the next segment burst accesses the same slave device as the current segment burst and that levels of the requests are the same; the DIFF signal denotes that the current segment burst ends, and predicts that the next segment burst accesses a different slave device from the current segment burst or that levels of the requests are different.

A signal sequence of bus usage requests that a master device transmits to an arbiter also comprises mastering signals with certain levels corresponding to the bus usage requests. These mastering signals are defined by software according to priority levels of data transfer of corresponding segment bursts, and are transferred in an order of data transfer. Priority levels of the bus usage requests are subject to the mastering signals, and a bus arbiter determines the order of responding requests directly based on levels of bus usage requests. Once a segment burst of a stream burst ends, the arbiter enters arbitration state in accordance with the mastering signals denoting an ending of a segment burst. The arbiter starts to arbitrate in the case that other bus usage requests with higher level are detected; or ends the arbitration state in the case that no other higher level of bus usage requests are found, and continues transfer of the current segment burst. Thus, during a stream burst transfer, the bus may respond a segment burst which does not pertain to the current stream burst but has higher priority level, and return to initial operation of the initial stream burst to continue transfer of the initial stream burst after the segment burst with higher priority level ends.

FIG. 1 is a structural view of a bus system according to an embodiment of the present invention. Referring to FIG. 1, the bus system of the present invention comprises a bus 101, a master device A 102, a master device B 103, a slave device A 104, a slave device B 105 and a slave device C 106 respectively coupling with the bus 101 for data transfer by sharing the bus. The bus 101 has a bus arbiter 107 respectively coupling with the master device A 102 and the master device B 103 for arbitrating bus usage requests of the master devices.

In an embodiment, MDstnum signal stands for a code of a slave device requested by a master device to the arbiter 107. As an example, three slave devices are used for description. Table 1 shows codes of the slave devices.

TABLE 1

| MDstnum | SIGNAL | DESCRIPTION |
| --- | --- | --- |
| 0 0 | 0 | Slave device A |
| 0 1 | 1 | Slave device B |
| 1 0 | 2 | Slave device C |
| 1 1 | | reserved |

Figure 2:
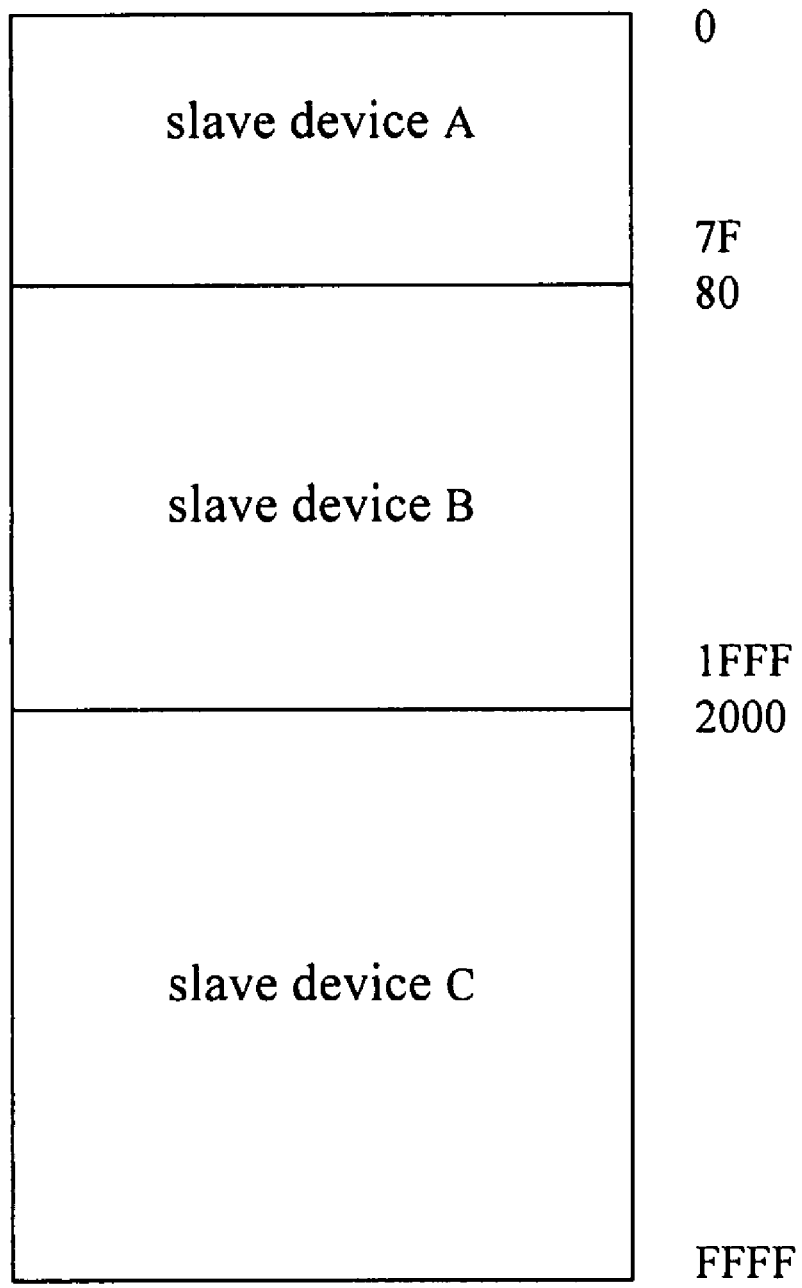
FIG. 2 schematically shows addresses allocation of slave devices of the bus system in FIG. 1.

The codes of the master device and the salve device of the present invention are not limited, and correspondingly, the codes of the MDstnum signals may be adjusted according to the number of the slave devices in practice. The addresses of the slave devices are respectively allocated as FIG. 2. The addresses of the slave device A are 00-7F, the addresses of the slave device B are 80-1FFF, and the addresses of the slave device C are 2000-FFFF.

A bus request signal line MReq [1:0] and a mastering signal line MLast [1:0] respectively couple to the arbiter 107. For clearly showing the signal line MReq [1:0] and the signal line MLast [1:0], other signal lines are omitted in FIG. 1. In this embodiment, each signal corresponds to a specific signal line, while in other embodiments the signals may be transferred in form of pipeline.

The bus request signal line MReq [1:0] transmits a bus usage request to the arbiter when a master device needs to transfer data. The bus request signal line MReq [1:0] comprises four types: IDLE, REQ, CREQ and LREQ, codes and implications of which are shown in Table 2.

TABLE 2

| MReq | SIGNAL | DESCRIPTION |
| --- | --- | --- |
| 0 0 | IDLE | No request |
| 0 1 | REQ | Ordinary read/write request |
| 1 0 | LREQ | Particular read/write request, which needs LOCK and has higher priority level than REQ |
| 1 1 | CREQ | Compulsory request with higher priority level than REQ |

As for the bus request signals MReq, REQ signal is ordinary read/write request, while LREQ and CREQ have higher priority levels than REQ. So LREQ or CREQ of MReq signals, which are transmitted by the master device A 102 and the master device B 103, will be responded more rapidly than REQ.

The LREQ is a type of particular request, which requests an uninterrupted operation of read/write. The read/write operation needs to be performed continuously, and the bus cannot respond other LREQ request during a period of a LREQ is responded. So LREQ is set to be a type of request with higher priority level.

The bus request signals MReq may be defined by programming each time data are transferred. Accordingly, priority levels of the bus requests from the master devices may be judged in practice each time data are transferred.

The IDLE request is defined for the purpose of avoiding external interference in the event that the MReq signal line is suspending and unstable when there is no bus usage request. This assures stability of the system from an aspect.

Use of the bus requests with different levels will be recited below.

In other embodiments, the bus request signals MReq may be defined as other levels and codes, which are acceptable and realizable for the skilled in the art.

The mastering signal line MLast [1:0] transfers mastering signals which denote status of data transfer required by the master devices. In this embodiment, the data transfer has four types status, CONT, SAME, DIFF and LAST, which are encoded and defined as Table 3.

TABLE 3

| MLast | SIGNAL | DESCRIPTION |
| --- | --- | --- |
| 0 0 | CONT | denoting that a segment burst does not end |
| 0 1 | LAST | denoting that a stream burst ends |
| 1 0 | SAME | denoting that a segment burst ends, and predicting next segment burst accesses the same slave device as the current segment burst, and has the same priority level as that of the current segment burst, for example, both are REQ or both are CREQ |
| 1 1 | DIFF | denoting that a segment burst ends, and predicting next segment burst accesses different slave device from the current segment burst, or has different priority level from that of the current segment burst |

In the data transfer process process, the CONT signal denotes that a segment burst does not end. The data addresses of the CONT signals are continuous. In this case, new addresses are neither received nor arbitrated. The LAST signal denotes that a stream burst ends. In this case, the arbiter 107 re-arbitrates bus usage requests for new data transfer. Both of the SAME signal and the DIFF signal denote that a segment burst ends, but a stream burst does not end. There are differences between the SAME signal and the DIFF signal. The SAME signal denotes a segment burst ends, and predicts next segment burst accesses the same slave device as the current segment burst, only the addresses may not aligned together, and has the same priority level as that of the current segment burst, for example, both segment bursts are REQ or CREQ. The DIFF signal denotes that a segment burst ends, and predicts next segment burst accesses a different slave device from the current segment burst, or has different priority level from that of the current segment burst.

In this embodiment, for simplifying use, the scope of addresses is limited in the same device when returning from arbitration state. Therefore, all the REQ requests of a stream burst can access the same slave device only.

Similarly, codes of the mastering signal MLast may be adjusted according to desired status of data transfer.

The data, which can be transferred by data transfer method in the form of the stream burst of the present invention, comprise single data and bursts. Stream bursts do not require consecutive addresses of data transfer. Namely, the single data and bursts may be not at continuous addresses. Regarding each burst, the corresponding slave device is required to be able to receive data in form of burst.

Tables 4-7, as examples, show data transfer method in form of stream burst.

TABLE 4

| | Accessing order | | | | | | | |
| --- | --- | --- | --- | --- | --- | --- | --- | --- |
| | 1 | 2 | 3 | 4 | 5 | 6 | 7 | 8 |
| MReq | REQ | REQ | REQ | REQ | REQ | REQ | REQ | REQ |
| MLast | CONT | CONT | CONT | CONT | CONT | CONT | CONT | LAST |
| MDstnum | 1 | 1 | 1 | 1 | 1 | 1 | 1 | 1 |

The slave device B 105 is the target slave device of a request in Table 4. The signals sequences of the request are regarded by the slave device B 105 as a stream burst consisting of a segment burst. The segment burst consists of 8 data with continuous addresses.

TABLE 5

| | Accessing order | | | | | | | |
|---|---|---|---|---|---|---|---|---|
| | 1 | 2 | 3 | 4 | 5 | 6 | 7 | 8 |
| MReq | REQ | REQ | REQ | REQ | REQ | REQ | REQ | REQ |
| MLast | CONT | SAME | CONT | SAME | CONT | SAME | CONT | LAST |
| MDstnum | 0 | 0 | 0 | 0 | 0 | 0 | 0 | 0 |

The slave device A 104 is the target slave device of a request in Table 5. The signals sequences of the request are regarded by the slave device A 104 as a stream burst consisting of four segment bursts. Each segment burst consists of 2 data with continuous addresses.

TABLE 6

| | Accessing order | | | | | | | |
|---|---|---|---|---|---|---|---|---|
| | 1 | 2 | 3 | 4 | 5 | 6 | 7 | 8 |
| MReq | REQ | REQ | CREQ | CREQ | CREQ | CREQ | REQ | REQ |
| MLast | CONT | DIFF | CONT | SAME | CONT | DIFF | CONT | LAST |
| MDstnum | 2 | 2 | 2 | 2 | 2 | 2 | 2 | 2 |

The signals sequences of a request in Table 6 are a stream burst consisting of four segment bursts. Each segment burst consists of 2 data with continuous addresses. In this stream burst, the request level of the second segment burst differs from the request level of the first segment burst, and thus, the MLast signal at the end of the first segment burst is DIFF signal; similarly, the request level of the fourth segment burst differs from the request level of the third segment burst, and thus, the MLast signal at the end of the third segment burst is DIFF signal. The second segment burst and the third segment burst have the same request levels and access the same slave device C 106, and thus, the MLast signal at the end of the second segment burst is SAME signal.

TABLE 7

| | Accessing order | | | | | | | |
|---|---|---|---|---|---|---|---|---|
| | 1 | 2 | 3 | 4 | 5 | 6 | 7 | 8 |
| MReq | REQ | REQ | REQ | REQ | CREQ | CREQ | CREQ | CREQ |
| MLast | CONT | SAME | CONT | DIFF | CONT | DIFF | CONT | LAST |
| MDstnum | 1 | 1 | 1 | 1 | 2 | 2 | 0 | 0 |

The signals sequences of a request in Table 7 are a stream burst consisting of four segment bursts. Each segment burst consists of 2 data with continuous addresses. The request level of the second segment burst is as the same as the request level of the first segment burst, and both of the first segment burst and the second segment burst access the slave device B 105. Thus, the MLast signal at the end of the first segment burst is SAME signal. In this stream burst, the request level of the third segment burst is CREQ, not REQ, and so the third segment burst is permitted to access a slave device different from prior segment burst. The fourth segment burst and the third segment burst are of the same request levels but access different slave devices, and thus, the MLast signal at the end of the third segment burst is DIFF signal.

Corresponding to the hierarchical bus requests, the arbiter 107 defines different arbitrating times for arbitrating bus usage requests. In this embodiment, the arbitrating times have two types, CREQ arbitrating time and REQ arbitrating time. In the REQ arbitrating time, the arbiter 107 may arbitrate all the bus requests, including CREQ, REQ and LREQ; while in the CREQ arbitrating time, the arbiter 107 may simply arbitrate bus requests with higher level, such as CREQ and LREQ.

Figure 3:
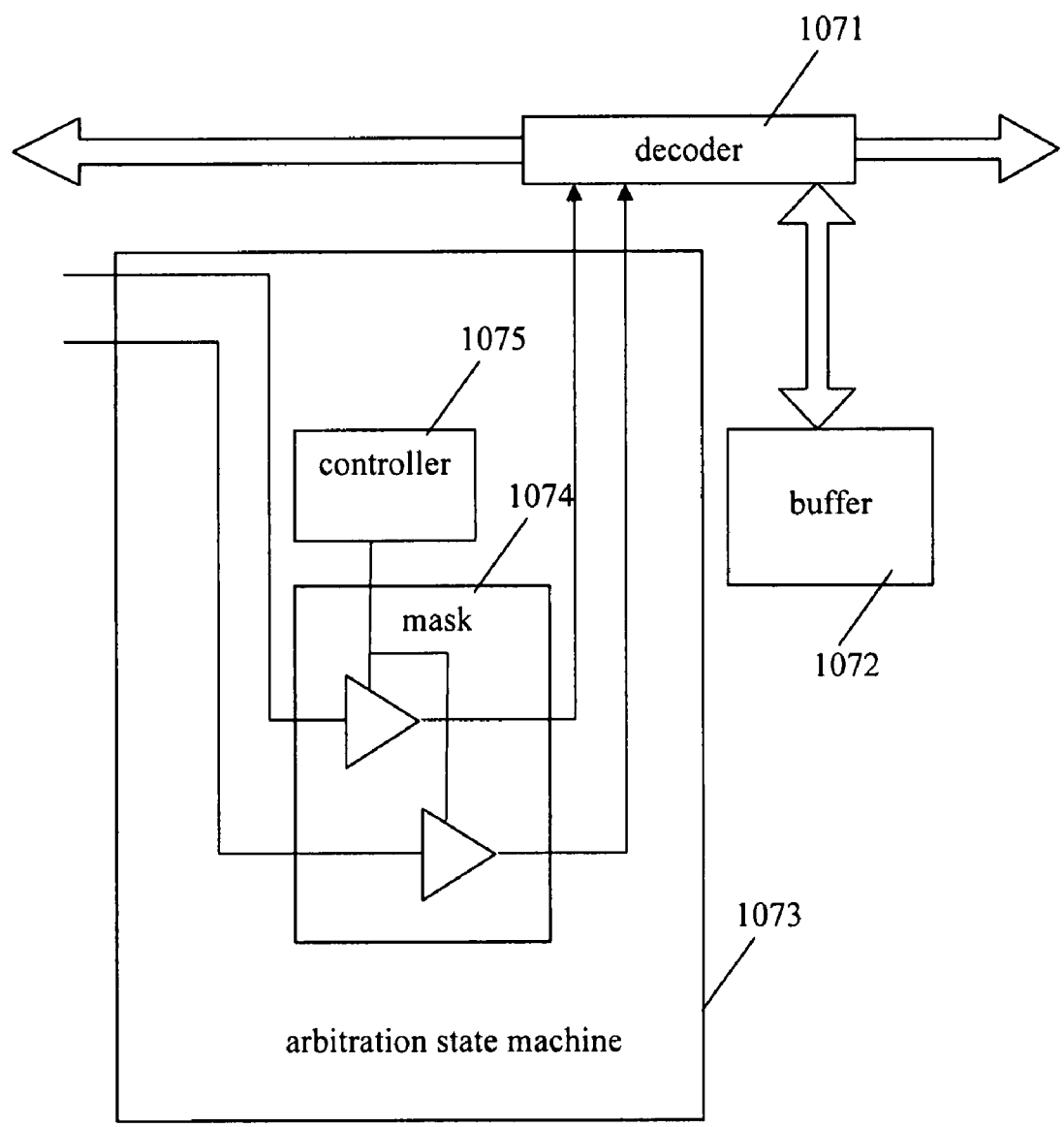
FIG. 3 is a structural view of an arbiter of the bus system in FIG. 1.

Referring to FIG. 3, the arbiter 107 is configured of a decoder 1071, a buffer 1072 and an arbitrating state machine 1073. The decoder 1071 decodes request signals selected by arbitration, for example, MReq signals, MLast signals and MDstnum signals, and transmits to corresponding master devices and slave devices. The arbitrating state machine 1073 chooses appropriate arbitrating time to arbitrate bus usage requests from master devices and judges the devices to be responded. The arbitrating state machine 1073 further includes a mask 1074 and a controller 1075.

The arbiter 107 detects MReq signal firstly, and in case there is a LREQ request, detects immediately if the bus 101 is at LOCK state. Ordinarily, when the bus 101 is performing a read/write atom operation such as LREQ, it enters the LOCK state automatically. When the bus 101 is at LOCK state, current read requests of LREQ are omitted.

After the arbiter 107 arbitrates, MLast signals of the bus requests are decoded to ALast signals by the decoder 1071. In this embodiment, according to types of the MLast signals, the ALast signals include four types, DIFF, SAME, LAST and CONT.

When the ALast signal is CONT, the bus 101 continues data transfer, and the arbiter 107 does not arbitrate.

When the ALast signal is DIFF or SAME, a stream burst does not end. The arbiter 107 transmits a higher level of arbitrating allowance signal ACREQ_arb signal. When the MReq signals do not include CREQ requests or LREQ requests but include only REQ requests or IDLE, the arbiter 107 does not arbitrate the bus requests from the master devices. The stream burst does not halt still continues the data transfer by the bus 101. When the MReq signals include CREQ requests or LREQ requests, the arbiter 107 enters CREQ arbitration time.

When ALast signal is LAST, a stream burst ends. The arbiter 107 transmits a higher level arbitration allowance signal ACREQ_arb and a lower level arbitration allowance signal AREQ_arb simultaneously. If the MReq signals do not include REQ requests, CREQ requests and LREQ requests, the arbiter 107 waits; if the MReq signals do not include CREQ requests and LREQ requests but include REQ requests, the arbiter 107 enters REQ arbitration time; if the MReq signals include CREQ requests or LREQ requests, the arbiter 107 enters CREQ arbitration time.

During CREQ arbitration time, the arbiter 107 arbitrates CREQ or LREQ requests by an ordinary algorithm to select a CREQ request or a LREQ request, and then transmits an authorization signal to the master device that transmits the selected request. The master device starts data transfer after receiving the authorization signal.

During REQ arbitration time, the arbiter impartially arbitrates REQ requests from all of master devices to select a REQ request, and transmits an authorization signal to the master device that transmits the selected request. The master device starts data transfer. The ordinary algorithm mentioned here is round robin arbitration algorithm or other arbitration algorithms known by the skilled persons in the art, and therefore does not need detailed description.

At CREQ arbitration time, REQ requests are omitted. The mask 1074 is defined corresponding to each MReq signal transmitted to the arbiter 107. Each mask 1074 has a CREQ-En signal port. The controller 1075 of the arbiter 107 enables the CREQ-En signal port. The CREQ-En signal and the MReq signal from an input port perform a logic calculation such that REQ requests signals are masked and CREQ or LREQ requests signals pass.

In this embodiment, AGrant and AMnum signals denote signals transmitted by the decoder 1071 after the arbiter 107 arbitrates. Both of the AGrant and AMnum signals are shared by all of the master devices. The AGrant signals denote that the arbiter 107 responds the master devices and the slave devices; and the AMnum signals denote codes of the master devices that the arbiter 107 authorizes to use the bus. In this embodiment, the master device A 102 is encoded as 1, and the master device B 103 is encoded as 2. The decoder 1071 also transmits ASNum signals that denote the slave devices of data transfer.

Before a stream burst ends, the MLast signal, which is transmitted by the master device performing data transfer, is LAST; before a segment burst ends, the MLast signal, which is transmitted by the master device performing data transfer, is SAME or DIFF signal. After the arbiter 107 arbitrates, when the ALast signals are LAST, SAME or DIFF signals, the arbiter 107 enters arbitration state. That is, the arbiter 107 enters arbitration state when a stream burst or a segment burst is finished. When arbitration is finished and a master device is authorized to use the bus for data transfer, AGrant signal is effective and is shared by all the master devices and the slave devices.

In the case that a stream burst does not end but a segment burst ends, other master devices, which are not performing data transfer, may be authorized the bus usage privilege because of higher priority level requests. In this embodiment, LREQ and CREQ have higher priority level than REQ. Accordingly, in the case that a stream burst does not end but a segment burst ends, the arbiter 107 re-arbitrates. If MReq signals transmitted by other master devices are LREQ or CREQ, the other master devices may participate in the arbitration; if MReq signals transmitted by other master devices are only REQ request, the requests of the other master devices are omitted, and the next segment burst of current stream burst is transferred.

In the case when a stream burst does not end but a segment burst ends, and other master devices, which are not performing data transfer, participate in bus arbitration and are authorized to the bus usage privilege, the stream burst of current master device which has not ended is buffered in the buffer 1072 of the arbiter 107. The bus right returns to the initial operation for re-arbitration when data transfer of the other authorized master device is finished.

Figure 4:
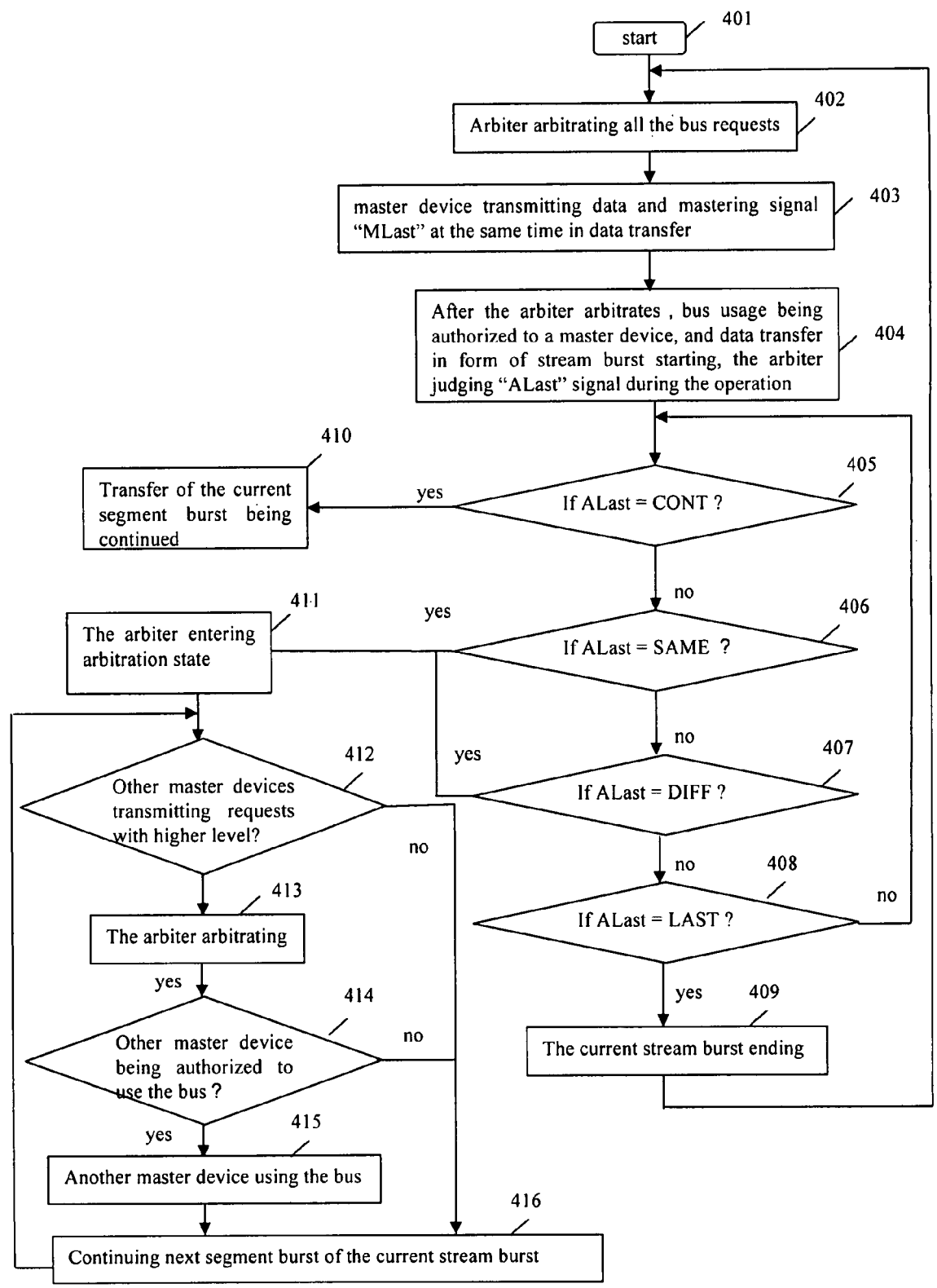
FIG. 4 is a flow chart of stream burst data transfer method according to the present invention.

FIG. 4 depicts a data transfer process of a stream burst.

Let's start from step 401. In the event there is no data transfer, if master devices transmit bus usage requests, the arbiter 107 arbitrates all the bus requests at step 402. At step 403, a bus request participating in the arbitration is authorized, and corresponding master device thereof uses the bus for data transfer and transmits a mastering signal MLast. Step 404 is operated at the same time as step 403. At step 404, the arbiter 107 selects the bus request, and the decoder 1071 of the arbiter 107 transmits the decoded ALast signal. In steps 405, 406, 407, 408, the ALast signal is detected, judge which type of the four types according to this embodiment. The arbiter 107 judges during data transfer. At step 405, if ALast is judged to be a CONT signal, denoting a segment burst does not end, then entering step 410 to continue data transfer of the current segment burst. ALast is judged to be a SAME signal at step 406 or is judged to be a DIFF signal at step 407, denoting a stream burst does not end but a segment burst ends. The arbiter 107 enters arbitration state at step 411. Meantime at step 412, whether new bus requests with higher level are transmitted is detected. If new bus requests with higher level are detected at step 412, the arbiter arbitrates among the next segment burst which following the current segment burst and the new bus requests with higher level. After arbitration, if a requirement of step 414 is not met, enter step 416 directly, the current stream burst continues to be transferred. If the requirement of step 414 is met, other master device is authorized to use the bus, and data transfer of the other master device is performed at step 415. After the other master device finishes the data transfer, return to the field of the initial stream burst at step 416. If ALast signal is judged to be LAST at step 408, the current stream burst ends, and the arbiter returns to the step 402 and arbitrates all of the bus requests.

Two examples below further interpret data transfer of stream bursts.

EXAMPLE 1

Figure 5:
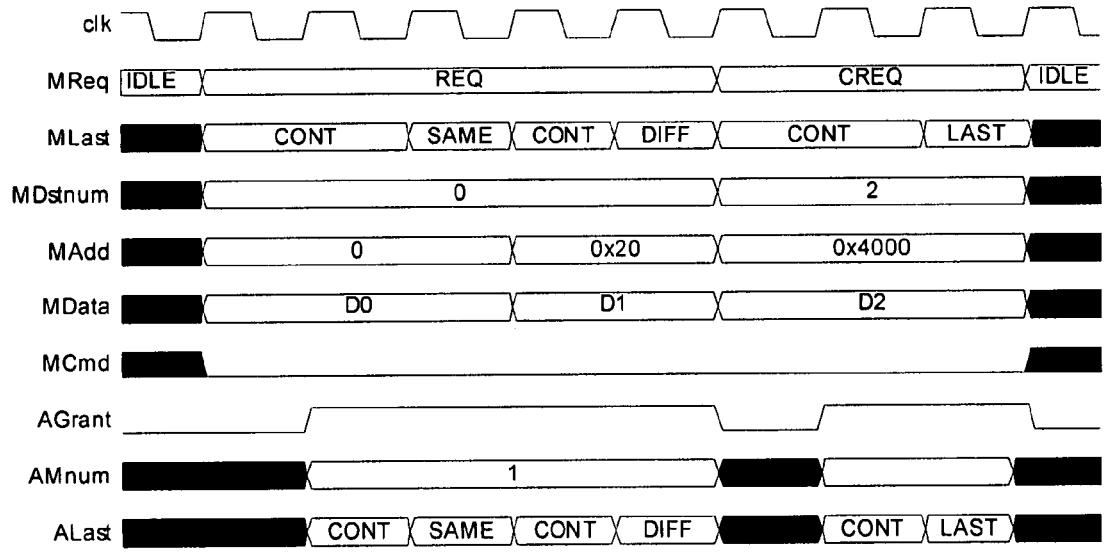
FIG. 5 is a timing diagram of a data transfer without interruption according to an embodiment of the present invention.

FIG. 5 shows a timing diagram of a data transfer without interruption according to an embodiment.

MAdd signals denote addresses data are transferred to; MData signals denote the transferred data; MCmd signals denote positive transferring commands, wherein the low level is read and the high level is write. FIG. 12 shows a complete stream burst consisting of three segment bursts.

MLast signal at the end of the first segment burst is SAME, denoting target addresses of data transfer are not consecutive but in the same slave device. Thus, MDstnum signal of the second segment burst is the slave device A (the code thereof is 0), which is as the same as the first segment burst. MAdd signal is 0×20, which is not continuous with the target addresses of the first segment burst. The third segment burst is of CREQ level, and MLast signal at the end of the second segment burst is DIFF. The target addresses of the third segment burst are in the slave device C (the code thereof is 2), which is different from the slave device of the second segment burst.

The arbiter 107 transmits AGrant signals and AMnum signals. The MLast at the end of the first segment burst is SAME, denoting target addresses of the next segment burst are in the same slave device. The AGrant signal remains effective (In this embodiment the high level is effective), denoting the arbiter 107 is still responding the master device. The MLast signal at the end of the second segment burst is DIFF, denoting target addresses of next segment burst are in the different slave device. The arbiter 107 arbitrates in the next clock cycle following the DIFF signal, and therefore cannot acknowledge the MLast signal and target slave device, and cannot respond the master device. The AGrant signal is at low level during the first cycle of the segment burst following the DIFF signal. In the next cycle, the arbiter 107 acknowledges MDstnum signal from a master device and responds the master device. The AGrant signal returns to high level, and remains high level until the stream burst ends. ADnum signal remains 1, meaning the master device A is the master device of the stream burst.

EXAMPLE 2

Figure 6:
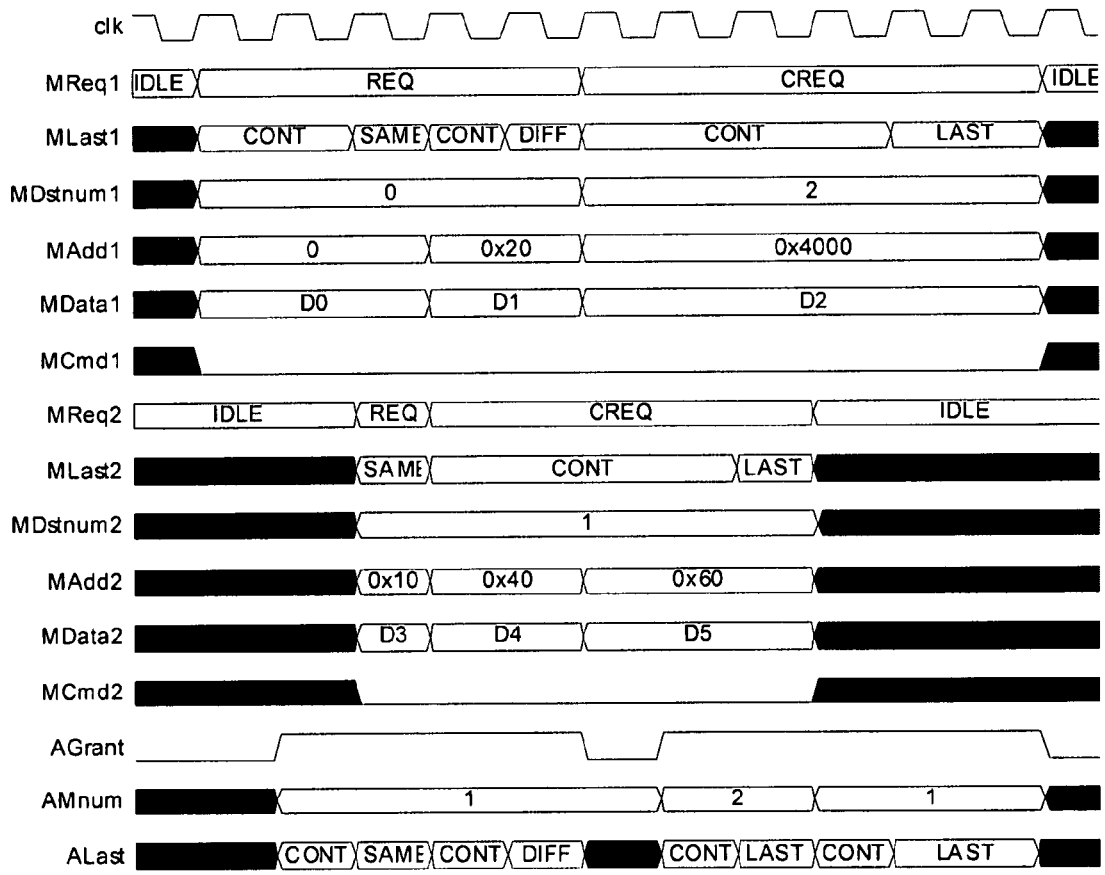
FIG. 6 is a timing diagram of a data transfer with interruption according to an embodiment of the present invention.

FIG. 6 shows a timing diagram of a data transfer with interruption according to an embodiment of the present invention. In the favor of description, MReq1, MLast1, MAdd1, MData1, MDstnum1 and MCmd1 respectively denote requests signals of data transfer from the master device A; while MReq2, MLast2, Madd2, MData2, Mdstnum2 and MCmd2 respectively denote requests signals of data transfer from the master device B. The arbiter 107 transmits ALast signals after response to MLast1 and MLast2 signals.

The stream burst of the master device A in FIG. 6 is almost identical to the stream burst of the master device A in FIG. 5 except that the master device A of FIG. 6 is interrupted during data transfer of the stream burst by other master device's bus request with higher level. Correspondingly, the timing of stream bursts from the master device A changes as well. The bus request of the master device A of FIG. 6, which is almost as same as of FIG. 5, includes a complete stream burst consisting of four segment bursts. The master device A of FIG. 6 delays at the third segment burst because the third segment burst of the master device A is interrupted by a CREQ request of the master device B.

Before the first segment burst of the master device A is finished, MLast1 is SAME, the arbiter 107 enters arbitration state. However, request MReq2 of the master device B is REQ level. A REQ level request cannot interrupt a stream burst in this embodiment, and so the master device A continues the second segment burst of the current stream burst. Before the second segment burst of the master device A is finished, MLast1 is DIFF, the arbiter 107 enters arbitration state. Request MReq2 of the master device B is CREQ level, and the third segment burst of the master device A is also a CREQ level request. The arbiter 107 arbitrates both of the CREQ level requests of the master device A and the master device B. In this embodiment, the arbiter 107 authorizes the master device B. Thus the third segment burst of the master device A temporarily halts, and the bus 101 firstly processes the bus request of the master device B. The third segment burst is stored temporarily in the buffer 1072 of the arbiter 107. After the bus request of the master device B is finished, the bus returns to the initial operation, and continues to perform the third segment burst of the master device A if there is no new bus usage requests. Also viewed from the figure, MAdd1 and MData1 delay at the third segment burst, and data transfer of the master device B is performing during the delay period. The AMnum signal of the arbiter 107 is 1 during the stream burst operation of the master device A. When the bus usage request of the master device B is authorized, the AMnum signal becomes 2, denoting that the master device performing data transfer is the master device B. When the data transfer of the master device B is finished, the AMnum signal becomes 1 again, denoting that the bus returns to the initial stream burst of the master device A and continues the data transfer of the initial stream burst.

Figure 7:
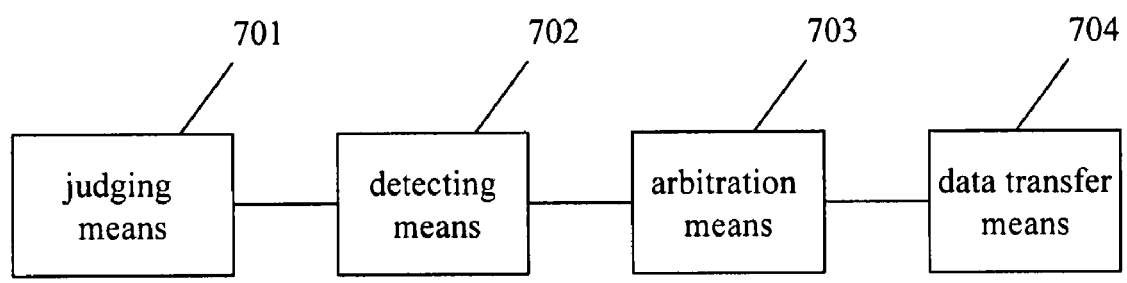
FIG. 7 is a diagram of a data transfer system performing data transfer of FIG. 4.

FIG. 7 is a diagram of a data transfer system performing data transfer of FIG. 4. The data transfer system is used for performing data transfer between master devices and slave devices through a bus. The data transfer involves data transfer in form of stream burst. The data transfer system comprises a judging means 701 for judging which signal a bus-mastering signal transmitted by a master device is of CONT signal, LAST signal, SAME signal or DIFF signal; a detecting means 702 for detecting whether other master devices transmit new bus requests with higher level when the judging means 701 judges the bus-mastering signal is SAME signal or DIFF signal; arbitration means 703 for arbitrating the request of the next segment burst of a stream burst of a current master device and bus requests with higher level from other master devices; and a data transfer means 704 for performing data transfer between an authorized master device and a slave device based on an arbitration result of the arbitration means 703. The arbitration means 703 may be an arbiter of FIG. 3.

The embodiment only describes more clearly, but does not limit, the present invention. It should be appreciated that, the present invention is not limited in the interpretation of the embodiment, and that, any modifications and equivalents of the present invention should be covered by the spirit and scope of the claims of the present invention.

What is claimed is:

1. A data transfer method, adapted for performing data transfer between master devices and slave devices through a bus, the data transfer involving data transfer in form of stream burst, the method comprising the following steps:
   a. arbitrating bus usage requests from master devices;
   b. a first master device authorized after arbitration, starting data transfer in form of stream burst, and at the same time transmitting a bus-mastering signal to the bus, a stream burst including at least one segment burst;
   c. judging which signal the bus-mastering signal is among CONT signal, LAST signal or intermediate signals, wherein CONT signal denotes a segment burst of a stream burst does not end, LAST signal denotes a stream burst ends, and the intermediate signals denote a segment burst of a stream burst ends but the stream burst does not end;
   d. when the bus-mastering signal is judged to be a CONT signal, the data transfer of a segment burst of the current stream burst continuing;

e. when the bus-mastering signal is judged to be an intermediate signal, checking if there is a new bus request with higher level from a second master device;

f. when a new bus request with higher level from the second master device is detected, arbitrating between the new bus request and the request of the next segment burst in the stream burst of the first master device;

g. performing data transfer firstly by the first or second master device which is authorized by arbitration in step f; and h. when the bus-mastering signal is judged to be a LAST signal, returning to step a.

2. The method according to claim 1, wherein step c is performed by judging among the CONT signal, the LAST signal, SAME signal as one of the intermediate signals and DIFF signal as one of the intermediate signals, wherein the SAME signal denotes that a segment burst of a stream burst ends and predicting next segment burst and current segment burst access the same slave device and have the same priority level, and the DIFF signal denotes that a segment burst of a stream burst ends and predicting next segment burst and current segment burst access different slave devices or have different priority levels.

3. The method according to claim 1, wherein the stream burst of the first master device is continued when no new bus requests with higher level from the second master device are detected at step e.

4. The method according to claim 1, wherein the stream burst of the first master device is temporarily halted when the second master device is authorized to transfer data firstly at step g.

5. The method according to claim 4, wherein after the authorized second master device finishes data transfer, next segment burst of the stream burst of the first master device is continued.

6. The method according to claim 1, further comprising decoding bus-mastering signals from the master devices.

7. A data transfer system, adapted for performing data transfer between master devices and slave devices through a bus, the data transfer involving data transfer in form of stream burst, the system comprising:

judging means for judging which signal of CONT signal, LAST signal and intermediate signals a bus-mastering signal is, the CONT signal denoting a segment burst of a stream burst does not end, the LAST signal denoting a stream burst ends, the intermediate signals denoting a segment burst of a stream burst ends but a stream burst does not end;

detecting means for detecting whether other master devices, except current master device, transmit new bus requests with higher level when the judging means judges the bus-mastering signal is the intermediate signal;

arbitration means for arbitrating between the request of the next segment burst of a stream burst of the current master device and the bus requests with higher level from other master devices detected by the detecting means; and data transfer means for performing data transfer between an authorized master device and a slave device through the bus based on an arbitration result of the arbitration means.

8. The data transfer system according to claim 7, wherein the intermediate signals comprise SAME signal and DIFF signal, the SAME signal denoting that a segment burst of a stream burst ends and predicting next segment burst and current segment burst access the same slave device and have the same priority level, the DIFF signal denoting that a segment burst of a stream burst ends and predicting next segment burst and current segment burst access different slave devices or have different priority levels.

9. The data transfer system according to claim 7, wherein the arbitration means comprises a decoder for decoding bus-mastering signals from the master devices.

10. The data transfer system according to claim 7, wherein the arbitration means comprises a buffer for temporarily storing data transfer of the stream burst of the current master device.

* * * * *